United States Patent
Tsuchida et al.

(10) Patent No.: US 9,278,638 B2
(45) Date of Patent: Mar. 8, 2016

(54) VEHICULAR SEATS

(71) Applicant: TOYOTA BOSHOKU KABUSHIKI KAISHA, Aichi-ken (JP)

(72) Inventors: Hiroshi Tsuchida, Aichi-ken (JP); Kenji Furukawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 147 days.

(21) Appl. No.: 14/035,341

(22) Filed: Sep. 24, 2013

(65) Prior Publication Data

US 2014/0110975 A1     Apr. 24, 2014

(30) Foreign Application Priority Data

Oct. 23, 2012   (JP) ................. 2012-233920

(51) Int. Cl.
*B60N 3/00* (2006.01)
*B60N 2/20* (2006.01)
*B60N 2/46* (2006.01)

(52) U.S. Cl.
CPC *B60N 3/001* (2013.01); *B60N 2/20* (2013.01); *B60N 2/4606* (2013.01); *B60N 3/002* (2013.01)

(58) Field of Classification Search
CPC ...... B60N 3/001; B60N 3/002; B60N 2/4606; B60N 2/20; B60N 2/206
USPC ............................ 297/173, 411.32
See application file for complete search history.

(56) References Cited

U.S. PATENT DOCUMENTS

| | | | | |
|---|---|---|---|---|
| 4,886,317 A * | 12/1989 | Konzmann | ......... | B60N 2/4633 297/115 |
| 5,588,697 A * | 12/1996 | Yoshida et al. | ............... | 297/173 |
| 6,238,002 B1 * | 5/2001 | Brewer et al. | ........... | 297/411.32 |
| 6,283,528 B1 * | 9/2001 | Townsend | ............. | B60N 2/245 296/65.01 |
| 6,378,941 B1 * | 4/2002 | Opfer | ................ | B60N 2/01575 297/183.1 |
| 6,588,822 B1 * | 7/2003 | Duvall, Jr. | ............ | B60N 2/3011 296/57.1 |
| 6,807,902 B1 * | 10/2004 | Ginter | ............................ | 100/44 |
| 7,677,656 B2 * | 3/2010 | Saberan | ............ | B60N 2/02558 297/188.04 |
| 8,056,980 B2 * | 11/2011 | Koutsky | .................. | B60N 2/14 180/329 |
| 8,763,538 B2 * | 7/2014 | Fukuhara | ....................... | 108/77 |
| 2006/0261644 A1 * | 11/2006 | Cutshall et al. | ............... | 297/173 |
| 2008/0265647 A1 * | 10/2008 | Amin et al. | ............. | 297/411.32 |
| 2009/0184559 A1 * | 7/2009 | Nakaya et al. | .......... | 297/411.32 |
| 2009/0309407 A1 * | 12/2009 | Saito et al. | ............... | 297/411.32 |

FOREIGN PATENT DOCUMENTS

| | | |
|---|---|---|
| JP | 2000-168420 | 6/2000 |
| JP | 2009-241768 | 10/2009 |
| JP | 2011-79436 | 4/2011 |
| JP | 2011-116303 | 6/2011 |

* cited by examiner

*Primary Examiner* — David R Dunn
*Assistant Examiner* — Tania Abraham
(74) *Attorney, Agent, or Firm* — Greenblum & Bernstein, P.L.C.

(57) ABSTRACT

Certain embodiments of the present invention include a vehicular seat having a seatback, a seat cushion, a table and an armrest. The seatback is preferably tiltably connected to a seat cushion. The table is preferably provided beside the seat cushion. The armrest is preferably mounted to a side portion of the seatback. The table preferably has a recess for avoiding from interfering the table with the armrest when the seatback is brought down to a predetermined position.

5 Claims, 11 Drawing Sheets

VEHICULAR SEATS

This application claims priority to Japanese patent application serial number 2012-233920, the contents of which are incorporated herein by reference.

BACKGROUND OF THE INVENTION

1. Field of the Invention

Embodiments of the present invention relate to vehicular seats equipped with a table.

2. Description of the Related Art

Japanese Laid-Open Patent Publication No. 2000-168420 discloses a vehicular seat. The vehicular seat has an armrest and a table. On the inside of the vehicle, the armrest is mounted to a side portion of the seatback. The table is disposed adjacent to the side of the seat cushion. However, when the seatback is brought down onto the seat cushion, the armrest will interfere with the table.

Therefore, there is a need in the art for a seat in which the armrest does not interfere with the table located beside the seat cushion when the seatback is brought down.

SUMMARY OF THE INVENTION

According to one aspect, a vehicular seat comprises a seatback, a seat cushion, a table and an armrest. The seatback may be tiltably connected to the seat cushion. "Tiltably connected" generally refers to a connection in which the seatback can rotate about or be tilted with respect to the location of the seat cushion. The table may be provided beside the seat cushion. The armrest may be mounted to a side portion of the seatback. The table may have a recess and/or hole such that the table will not interfere with the armrest when the seatback is brought down to a predetermined position.

Thus, even when the seatback is brought down to the predetermined position, the armrest does not interfere with the table. Thus, there is no need to set the table at a low position in order to avoid interference with the armrest. As a result, it is possible for the table to be set to a height in which it is easy to use.

In another aspect, the table may move between a use position and a folded position. In the use position, the table is preferably horizontally extended from the side portion of the seat cushion. In the folded position, the table preferably extends along the side portion of the seat cushion. The recess and/or hole may prevent the table from interfering with the armrest when the table is in either the use position or the folded position.

As a result, when the seatback is brought down, the recess and/or hole may prevent the table from interfering with the armrest. Thus, the recess and/or hole may prevent interference between the table and the armrest.

In another aspect, the table may have a rotation shaft for allowing rotation between the use position and the folded position. The rotation shaft typically extends in a longitudinal direction at an edge of the table near the seat cushion during the use position. The recess and/or hole is preferably situated on the axis of the rotation shaft.

Accordingly, the rotation shaft can be positioned at a sufficient height so that the folded table may not interfere with the floor. The armrest can be provided so as not to interfere with the edge of the table near the rotation shaft provided beside the seat cushion.

DETAILED DESCRIPTION OF THE INVENTION

Each of the additional features and teachings disclosed above and below may be utilized separately or in conjunction with other features and teachings to provide improved vehicular seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
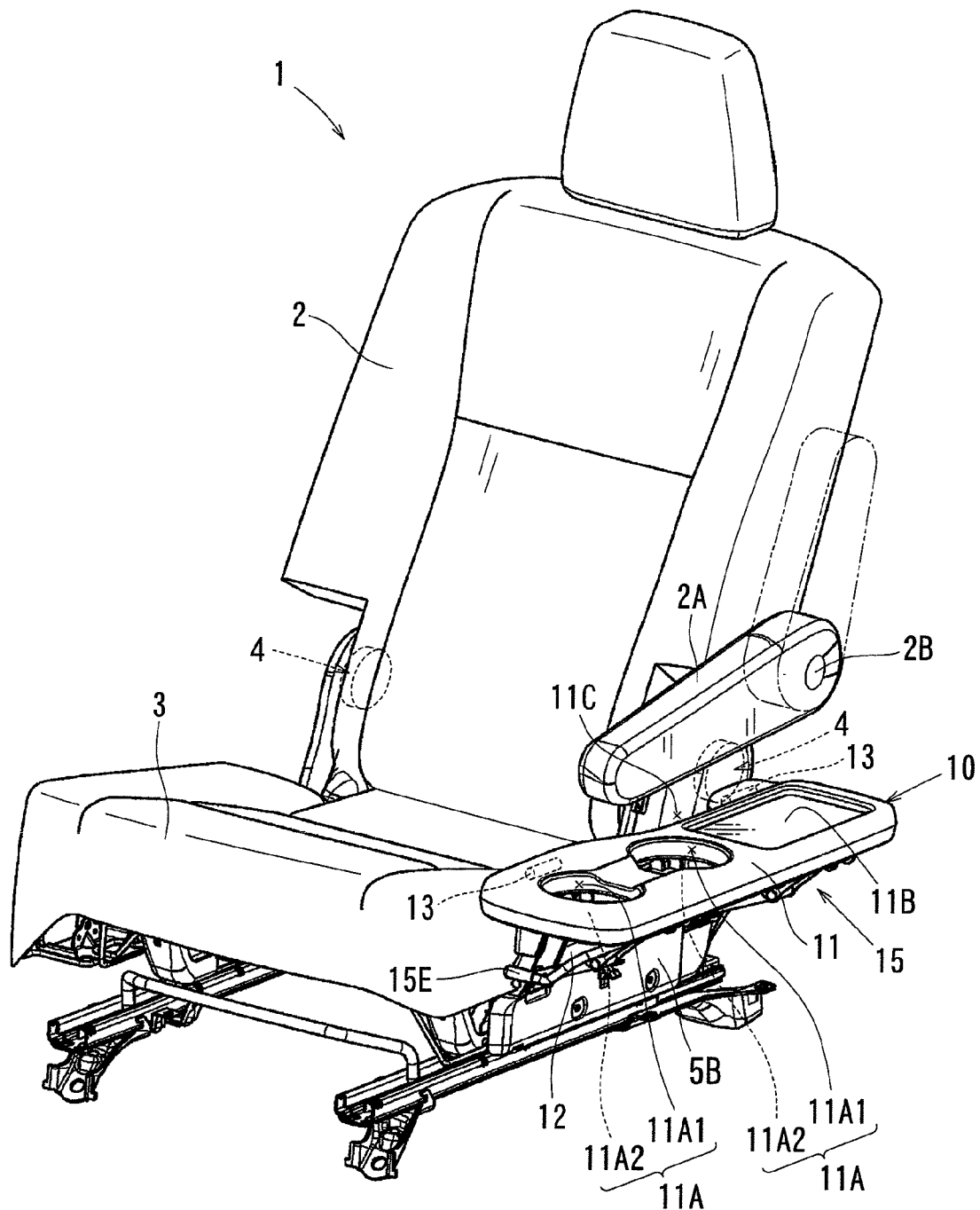
FIG. 1 is a perspective view of a vehicular seat having a table on a side thereof.

A table 10 will be described with reference to FIGS. 1 to 10. As shown in FIG. 1, the table 10 may be provided on the inner side of the vehicle so as to be adjacent to the side portion (i.e., the right-hand side) of a vehicular seat 1. The table 10 may be equipped with two cup holders 11A on which an occupant may set beverage containers, and a recessed accessory holder 11B for holding small articles. The table 10 can be rotated with respect to the side portion of the vehicular seat 1 so as to be folded. The table 10 can be switched between an expanded state (use position) shown in FIG. 1 and a storage position shown in FIG. 2. In the expanded state, a table main body 11 of the table 10 is positioned so as to preferably extend horizontally from the side portion of the vehicular seat 1. In the storage state, the table main body 11 preferably extends vertically along the side portion of the vehicular seat 1. A handle 15E may be provided at the front lower portion of the table main body 11. When the user pushes down on the handle 15E, the table main body 11 is moved from the storage position to the expanded position. When the user pulls up on the handle 15E, the table main body 11 is moved from the expanded state to the storage state.

As shown in FIG. 1, the table 10 has a folding mechanism 15 and a stopper structure provided in the folding mechanism 15. The stopper structure supports the table main body 11 in an expanded state from below. The stopper structure maintains the table main body 11 at an expanded position to prevent the table main body from being lowered should the table main body 11 receives a load from above.

Figure 3:
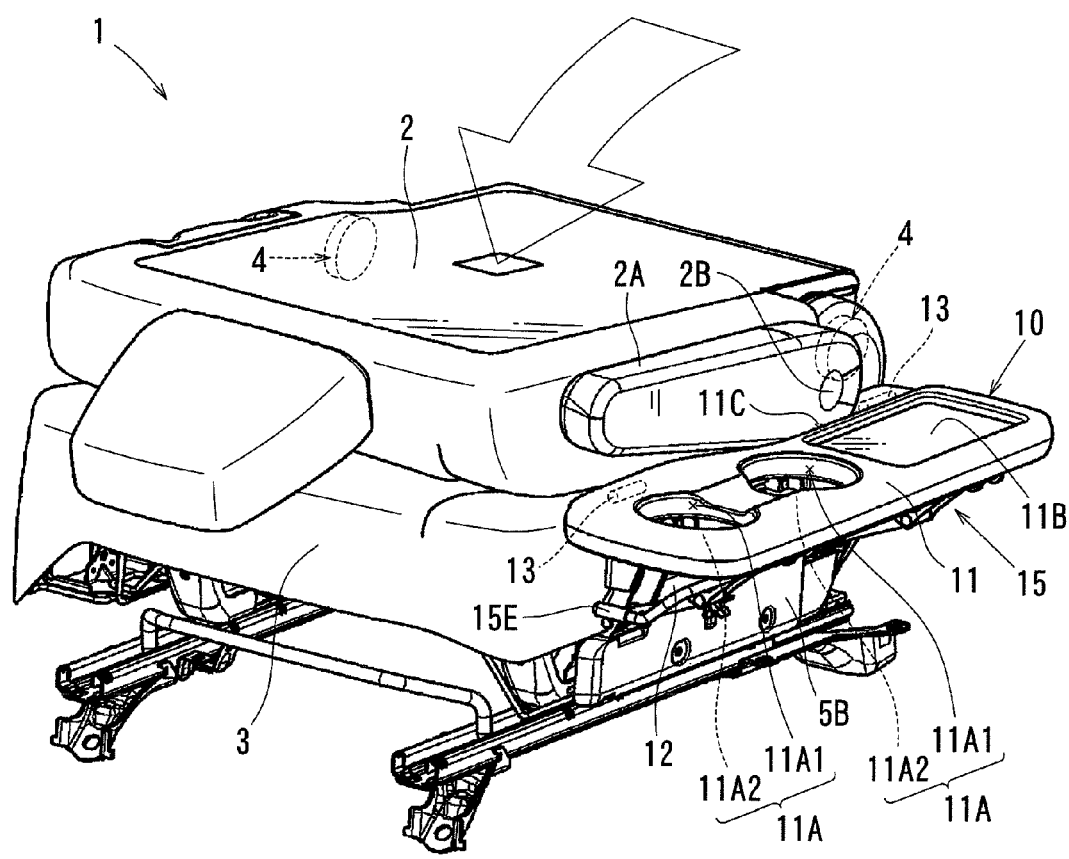
FIG. 3 is a perspective view of the vehicular seat when the seat back is brought down to a folded position while the table is expanded.
Figure 4:
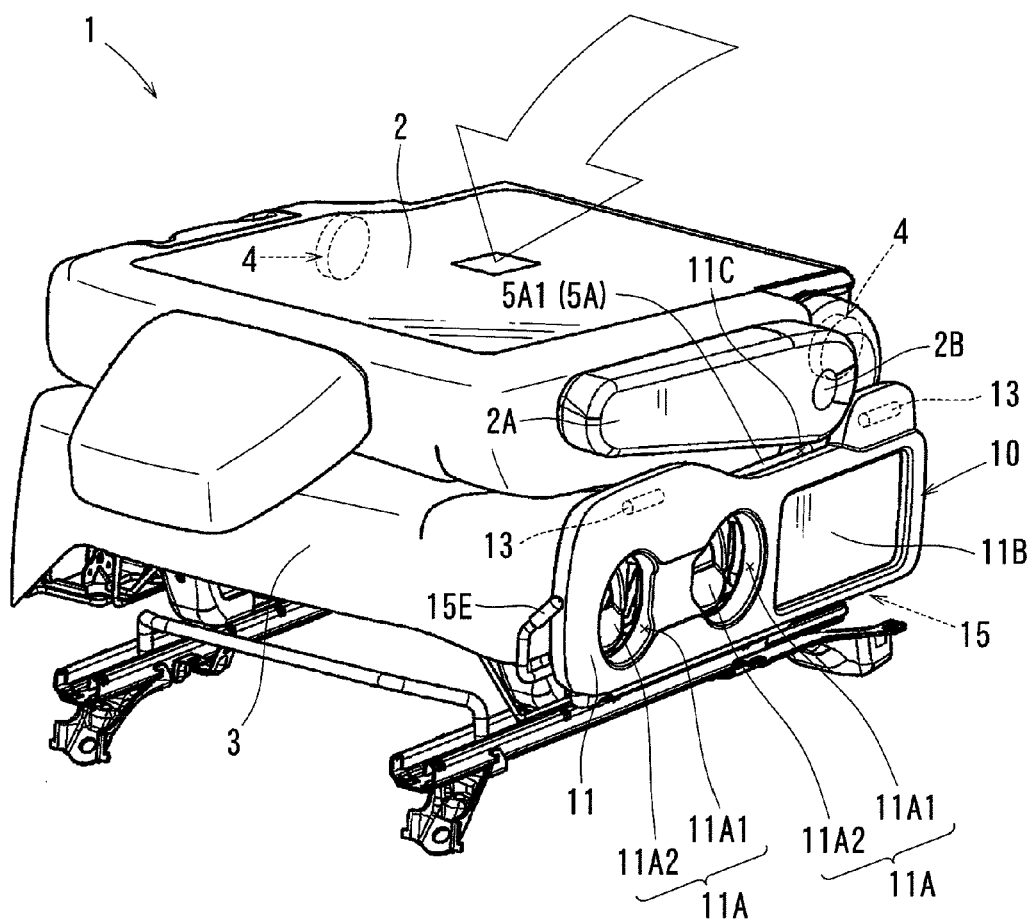
FIG. 4 is a perspective view of the vehicular seat when the seat back is brought down to the folded position while the table is in a storage state.

As shown in FIGS. 3 and 4, a seatback 2 of the vehicular seat 1 can be brought down to a folded position. At the folded position, the seatback 2 contacts an upper surface of a seat cushion 3. An armrest 2A is mounted to a side portion of the seatback 2. A recess 11C is formed in the table main body 11. The recess 11C helps to prevent interference between the table main body 11 and the armrest 2A when the seatback 2 is brought down to the folded position. A portion of the armrest 2A brought down forwards together with the seatback 2 is preferably received by the recess 11C. No matter whether the table main body 11 is in the expanded state or the storage state, the recess 11C helps to prevent interference between the armrest 2A and the table main body 11.

The vehicular seat 1 shown in FIG. 1 is a second-row passenger seat of a vehicle. The second-row passenger seat is behind the driver's seat in a vehicle having three rows of seats. The vehicular seat 1 is provided with the seatback 2 and the seat cushion 3. The lower end portions of both the right and left side portions of the seatback 2 are respectively connected to the rear end portions of both the right and left side portions of the seat cushion 3 via reclining devices 4. The reclining devices 4 function as rotary shaft devices providing for locking of rotation. The reclining devices 4 freely adjust the backrest angle of the seatback 2 with respect to the seat cushion 3. Thus the seatback 2 may rotate forward or backward.

As shown in FIG. 1, normally, the reclining devices 4 maintain a locked state in which the backrest angle of the seatback 2 is fixed. A release lever (not shown) is provided on the side portion of the seat cushion 3 nearest the outside of the vehicle (the left-hand side as seen in the drawing). Hooked between the seatback 2 and the seat cushion 3 is a spring (not shown) constantly urging the seatback 2 forward. By operating the release lever, the locked state of the reclining devices 4 may be selectively released. The backrest angle of the seatback 2 can be freely adjusted in a front-rear direction. Due to the urging force of the spring, the seatback 2 may be raised to a position where the seatback 2 abuts a back of the seated occupant. When the back of the seated occupant rotates in the front-rear direction, the seatback 2 also rotates in conformity with the rotation, thereby adjusting the backrest angle of the seatback 2.

When nobody is seated on the vehicular seat 1 and the release lever is operated, the urging force of the spring rotates the seatback 2 to a position where the seatback 2 abuts the upper surface of the seat cushion 3 (see FIGS. 3 and 4). As for the reclining devices 4, it is possible to employ ones disclosed in documents such as Japanese Laid-Open Patent Publication No. 2011-116303.

As shown in FIG. 1, the armrest 2A for the occupant seated on the vehicular seat 1 is preferably mounted to the side portion of the seatback 2. This side portion of the seatback 2 is located towards the center of the vehicle (the right-hand side as seen in the drawing). The armrest 2A is pivoted by a support shaft 2B provided on the side portion of the seatback 2. The armrest 2A can be switched between a non-use position and a use position. When in the non-use position, the armrest 2A extends upwards from the support shaft 2B along the seatback 2. The armrest 2A may be rotated to be brought down and forward from the non-use position to the use position. In the use position, the armrest 2A extends forwards from the support shaft 2B, allowing an elbow of the seated occupant to rest on the upper surface of the armrest 2A.

The amount of rotation in each direction of the armrest 2A is regulated by a stopper structure (not shown). As a result, the armrest 2A rotates between the non-use position and the use position. When in the non-use position, the armrest 2A is locked by a lock mechanism (not shown). The lock mechanism retains the armrest 2A in the non-use position unless a forward tilting force of not less than a predetermined level is applied thereto. The lock mechanism prevents the armrest 2A from falling from the non-use position to the use position due to gravity. When a forward tilting force of not less than the predetermined level is applied to the armrest 2A, the lock mechanism allows the armrest 2A to be rotated from the non-use position to the use position.

Figure 5:
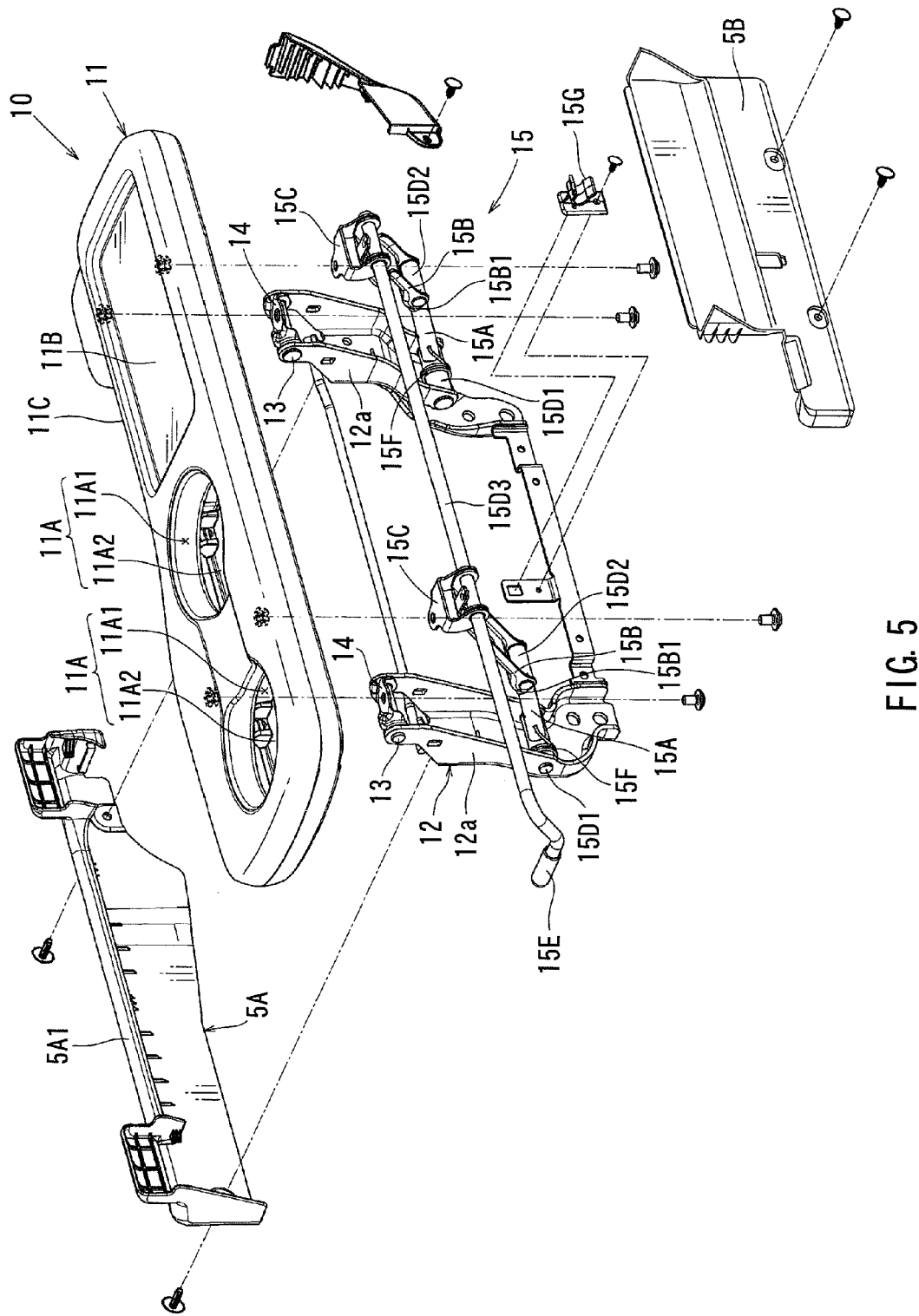
FIG. 5 is an exploded view of the table.

As shown in FIG. 5, the table 10 preferably has a table main body 11, a base 12, two rotation shafts 13, brackets 14, and a folding mechanism 15. The table main body 11 is preferably formed as a hollow plate through blow molding of polypropylene (PP) resin, and is preferably of a light weight. The table main body 11 is preferably provided with the two cup holders 11A, a recessed accessory holder 11B, and the recess 11C.

As shown in FIG. 1, the cup holders 11A are preferably arranged longitudinally in the front area of the table main body 11. The accessory holder 11B is preferably a rectangular recess in the rear area of the table main body 11. The recess 11C is preferably provided in a first edge portion of the table main body 11. A first side portion is adjacent to the seat cushion 3 when the table main body 11 is expanded to the horizontal position. The recess 11C may be longitudinally elongated, and may penetrate through the table main body 11 in the thickness direction of the table main body 11.

As shown in FIG. 5, each of the cup holders 11A preferably has a round hole 11A1 and a support member 11A2. The round hole 11A1 penetrates through the table main body 11. The support member 11A2 is rotatably connected to a bottom portion of the table main body 11 by means of a hinge. The support member 11A2 is constantly urged by a spring (not shown). The spring is provided at a connection portion between the support member 11A2 and the table main body 11. The support member 11A2 is urged by the spring so as to cover the round hole 11A1, and is retained at the bottom portion of the table main body 11. The table main body 11 is retained in a horizontal position, and a beverage container is inserted into each round hole 11A1. The bottom of the beverage container pushes the support member 11A2 down, and the support member 11A2 develops. The support member 11A2 is inclined, and is locked to a stopper structure (not shown). As a result, the support member 11A2 supports the beverage container.

The base 12 shown in FIG. 5 may be integrally connected to the side portion of the vehicle inner side framework (not shown) of the seat cushion 3. The base 12 may be a pair of front and rear vertically elongated steel plate members 12a. The front and rear edges of each steel plate member 12a may be bent toward the seat outer side, whereby the strength of the steel plate member 12a is enhanced. The base 12 may be covered with an inner side shield 5A from the seat inner side (the seat cushion 3 side). The inner side shield 5A consists of a single component formed of resin, and covers the space between the upper portions of the pair front and rear steel plate members 12a. The base 12 is covered with an outer side shield 5B from the seat outer side. The outer side shield 5B consists of a single component formed of resin, and covers the space between the pair of front and rear steel plate members 12a. The inner side shield 5A and the outer side shield 5B are provided at positions where they do not overlap the movement path of the table main body 11.

Each rotation shaft 13 is rotatably connected to the upper portion of each steel plate member 12a and a bracket 14. Each rotation shaft 13 extends in the longitudinal direction. The brackets 14 are connected to the back surface edge of the table main body 11 adjacent to the seat cushion 3. The brackets 14 are installed in the vicinity of the front and rear end portions of the table main body 11.

Figure 6:
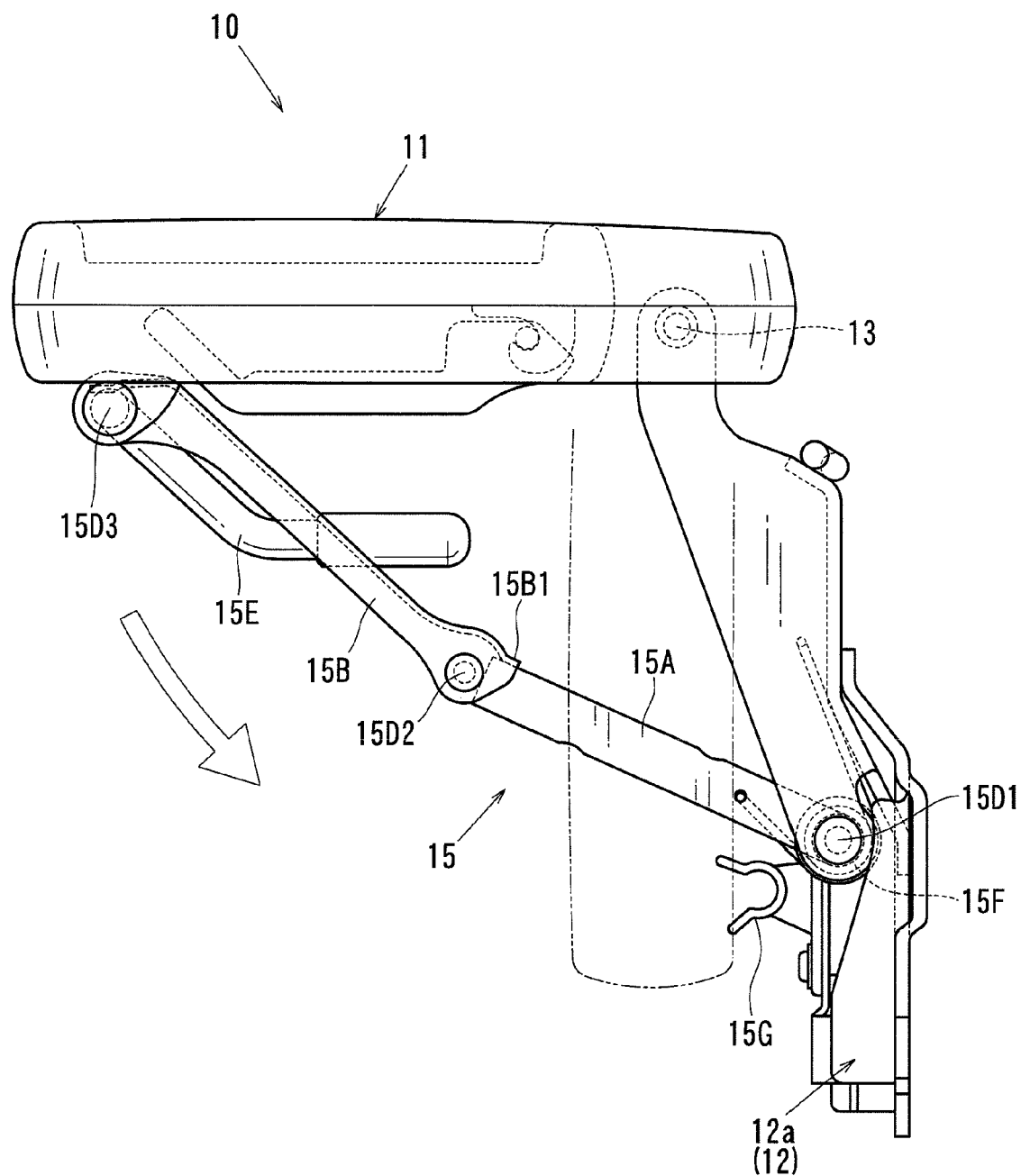
FIG. 6 is a rear view of the table in an expanded state.

As shown in FIGS. 5 and 6, the folding mechanism 15 has a pair of front and rear quadric link mechanisms. Each quadric link mechanism has a first link 15A and a second link 15B. One end of the first link 15A is rotatably connected to the lower portion of the steel plate member 12a of the base 12 by a connection shaft 15D1. The connection shaft 15D1 extends in the longitudinal direction. The other end of the first link 15A is rotatably connected to one end of the second link 15B by a connection shaft 15D2.

As shown in FIG. 5, the folding mechanism 15 preferably has front and rear brackets 15C. Each bracket 15C may be rotatably connected to the other end of a second link 15B by a connection shaft 15D3. The connection shaft 15D3 is preferably elongated in the longitudinal direction, and may be integrally connected to the other end of each second link 15B. The connection shaft 15D3 may pass through the front and rear brackets 15C. The brackets 15C may be connected to the back surface of the edge of the table main body 11 adjacent to the seat cushion 3.

Figure 7:
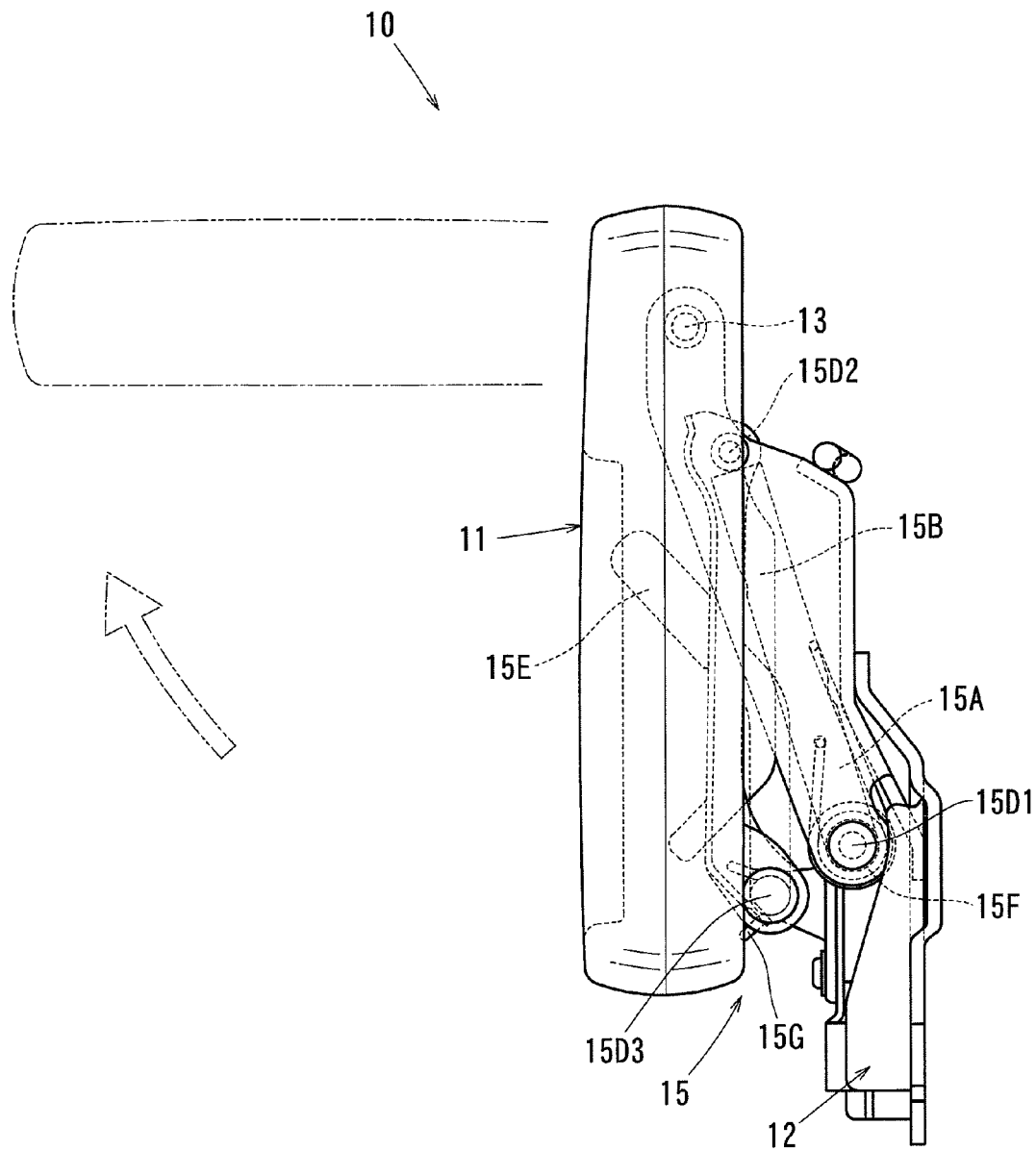
FIG. 7 is a rear view of the table in the storage state.

As shown in FIGS. 6 and 7, the quadric link mechanism has the first link 15A, the second link 15B, the table main body 11, and the base 12 connected through joints. The quadric link mechanism is configured to make a link movement of one degree of freedom. The folding mechanism 15 has a handle 15E operated to move the table main body 11. As shown in FIG. 5, the handle 15E is formed at the front end portion of the connection shaft 15D3.

FIG. 6 shows a state in which the table main body 11 has been expanded to the horizontal position. When the user raises the handle 15E, the second link 15B rotates counterclockwise together with the connection shaft 15D3 around the connection shaft 15D3. As a result, the connection shaft 15D2 moves upwardly, and the second link 15B moves toward the first link 15A as shown in FIG. 7. The second link 15B and the first link 15A overlap each other to move to the base 12. As a result, the table main body 11 rotates downwardly around the rotation shafts 13, and is superimposed on the base 12. In this way, the table main body 11 is stored on the side of the vehicular seat 1.

As shown in FIGS. 5 and 7, the folding mechanism 15 preferably has a receiving member 15G integrally provided on the base 12. When the table main body 11 is in the storage state, the intermediate portion of the connection shaft 15D3 is elastically fitted into the receiving member 15G As a result, the table main body 11 is retained in the storage state.

As shown in FIG. 7, when the table main body 11 is in the storage position, the user may push the handle 15E down. As a result, each second link 15B rotates together with the connection shaft 15D3, and each second link 15B rotates clockwise around the connection shaft 15D2, with each second link 15B moving away from the first link 15A. As shown in FIG. 6, the connection shaft 15D3 is detached from the receiving member 15G, and the first link 15A moves away from the base 12 in the seat width direction. Each first link 15A rotates counterclockwise, and the table main body 11 is raised by each second link 15B. The table main body 11 rotates around rotation shafts 13 to the horizontal position, and the table main body 11 is expanded.

As shown in FIG. 6, the second link 15B has a lock claw 15B1 extending from the connection end portion connected with the first link 15A. When the second link 15B rotates in the developing direction, the lock claw 15B1 abuts the first link 15A to regulate the rotation of the second link 15B. When the movement of the second link 15B is restricted by the lock claw 15B1, the connection shaft 15D2 is positioned downwardly beyond a straight line connecting the connection shaft 15D1 and the connection shaft 15D3.

Thus, when a load is applied onto the table main body 11 in the horizontal position, each second link 15B receives a force to effect rotation in the expanding direction due to the load. The load is received by the lock structure in which the lock claw 15B1 abuts the first link 15A. As a result, the table main body 11 is maintained in the horizontal position without being lowered.

As shown in FIGS. 5 and 6, the folding mechanism 15 preferably has torsion springs 15F each hooked to the connection portion between each first link 15A and the base 12. The torsion springs 15F constantly urge the first links 15A in the developing direction. With the table main body 11 being retained in the storage position, the handle 15E is pushed down and the connection shaft 15D3 is detached from the receiving member 15G As a result, the torsion springs 15F urge the first links 15A in the developing direction, and the second links 15B are rotated. The lock claws 15B1 of the second links 15B abut the first links 15A, and the table main body 11 is maintained in the horizontal position.

Figure 8:
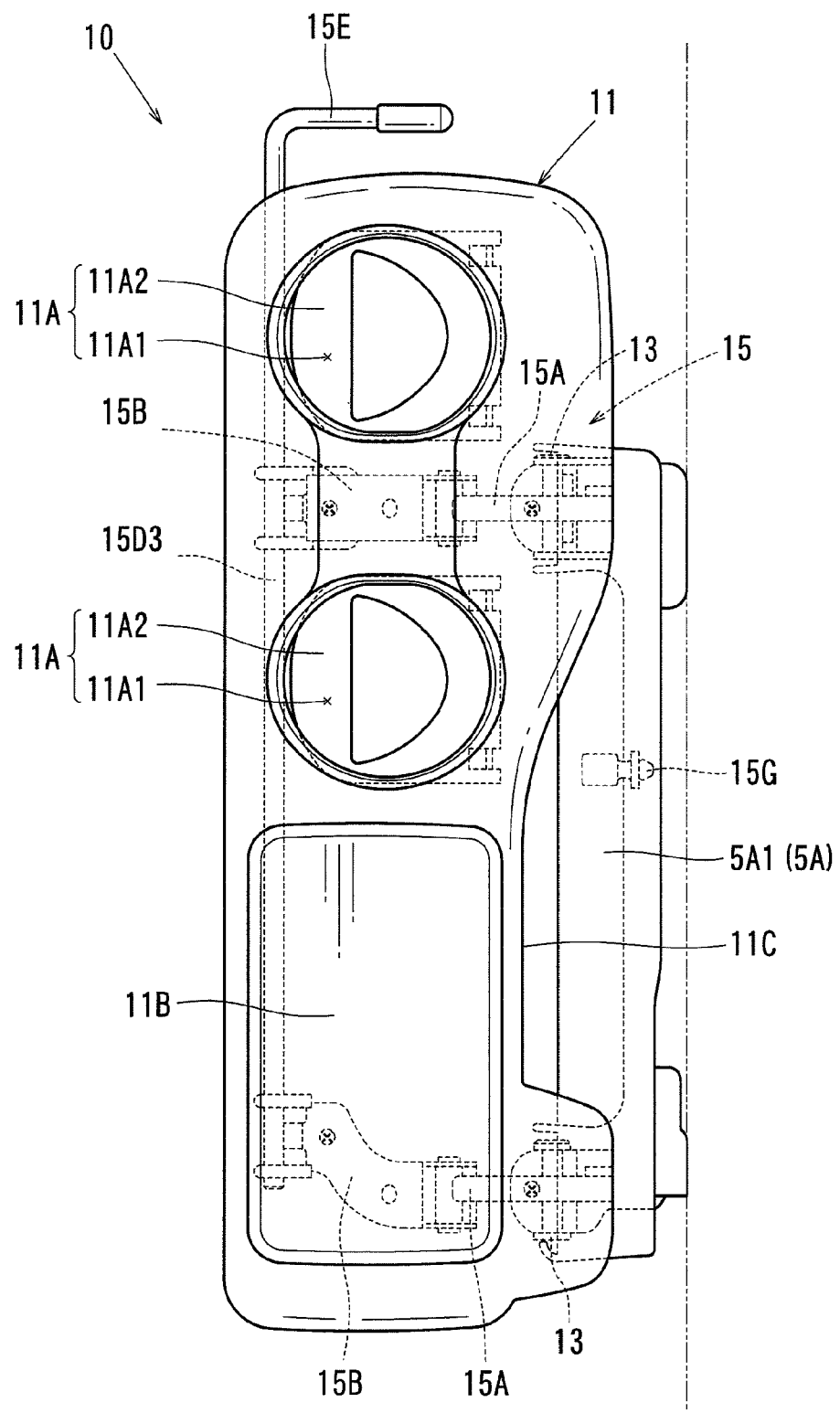
FIG. 8 is a plane view of the table.

As shown in FIG. 8, the recess 11C is formed at one edge portion of the table main body 11. The one edge portion is adjacent to the seat cushion 3 when the table main body 11 is in the horizontal position. The recess 11C opens on an edge portion of the table main body 11, is elongated in the longitudinal direction, and penetrates through the table main body 11 in the thickness direction. The recess 11C is formed between the rotation shafts 13 situated at the front and rear positions of the table main body 11. The recess 11C is situated on the same axis as the rotation shafts 13.

Figure 2:
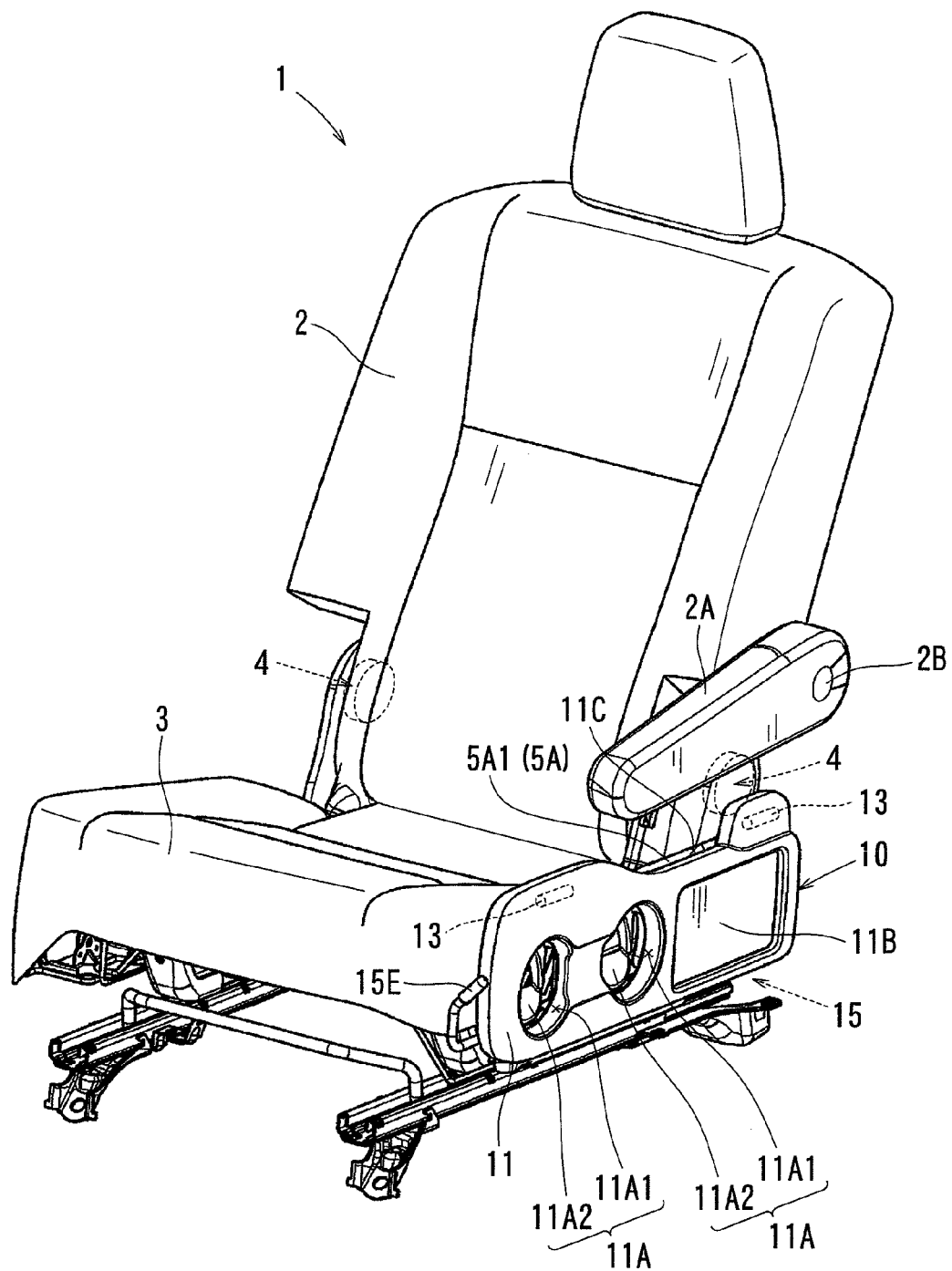
FIG. 2 is a perspective view of the vehicular seat in a state in which the table is folded.

In FIG. 1, the table main body 11 is expanded to the use position. In FIG. 2, the table main body 11 is folded in the storage position. The recess 11C forms a space in the region between the rotation shafts 13 in both FIG. 1 and FIG. 2. The space opens upwardly. When the seatback 2 is tilted to the folded position, a portion of the armrest 2A is received by the recess 11C. In the FIG. 3, the table main body 11 is expanded to the use position. In the state of FIG. 4, the table main body 11 is folded in the storage position. The recess 11C can prevent interference between the armrest 2A and the table main body 11 in both states shown in FIG. 3 and FIG. 4.

The recess 11C is a hole penetrating through the table main body 11 in the vertical direction. As shown in FIG. 5, an upper surface 5A1 of the inner side shield 5A is situated at a bottom portion of the recess 11C. The upper surface 5A1 covers the recess 11C from below. The side edge of the upper surface 5A1 is adjacent to the side portion of the seat cushion 3. Thus, no matter whether the table main body 11 is in the use position or in the storage position, the inner side shield 5A and the side portion of the seat cushion 3 can prevent an object from being dropped through the recess 11C.

As described above, the table 10 has the recess 11C in order to prevent the table 10 from interfering with the armrest 2A. Thus, even when the seatback 2 is folded, the armrest 2A preferably does not interfere with the table 10 provided beside the seat cushion 3. As a result, it is possible to relatively freely select the set position of the table 10 with respect to the seat cushion 3. For example, it is possible to set the height of the table 10 convenient for use without having to lower its position in order to avoid the table 10 from interfering with the armrest 2A.

The rotation shafts 13 of the table 10 are formed at the edge of the table 10 near the seat cushion 3 when the table 10 is in the use position. The rotation shafts 13 extend in the seat longitudinal direction. The recess 11C is situated on the axis of the rotation shafts 13. Thus, the position of the rotation shafts 13 can be sufficiently high so that the folded table 10 may not interfere with the floor. The armrest 2A can be provided at the edge of the table 10 near the rotation shafts 13, without causing interference between the armrest 2A and the edge of the table 10, which is provided beside the seat cushion 3.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As described above, the table 11 can be provided so as to be foldable beside the seat cushion 3. Alternatively, the table may be maintained in the expanded, use position so that the table may not be folded beside the seat cushion 3. The table is provided with a recess to help to avoid the table from interfering with the armrest 2A. This makes it possible to set the position of the table at a higher level.

The table may be formed of polypropylene resin through blow molding, or of some other resin material selected from various resin materials.

In the expanded state shown in FIG. 1, the table main body 11 is in the use position. In the folded state of FIG. 2, the table main body 11 is in the storage position. As described above in both the expanded state and the folded state, the upper portion of the recess 11C is open to be able to receive the armrest 2A. Alternatively, the recess may receive the armrest 2A in one of the expanded state and/or the folded state.

The recess 11C may be a hole or a recess capable of receiving the armrest 2A.

The table may separately have a first recess capable of receiving the armrest 2A in the expanded state, and a second recess capable of receiving the armrest 2A in the folded state.

The recess 11C may be formed at the edge of the table main body 11 near the seat cushion 3 as described above. Alternatively, the recess may be formed at any other suitable portion of the table main body 11.

The table 10 may be provided on a vehicular seat as described above, or may be provided on the floor to be installed beside the seat cushion 3.

As described above, the recess 11C may receive the armrest 2A when the seatback 2 is brought down to the folded position. Alternatively, the recess 11C may receive the armrest 2A when the seatback 2 is brought down to some position other than the folded position. This could be a walk-in position, for example. In the walk-in position, the seatback 2 is tilted forwards. This enables the passenger to get in and out of the vehicle at the rear of the seatback 2. The recess 11C may receive the armrest 2A when the seatback 2 is located at any angle with respect to the seat cushion 3.

Figure 9:
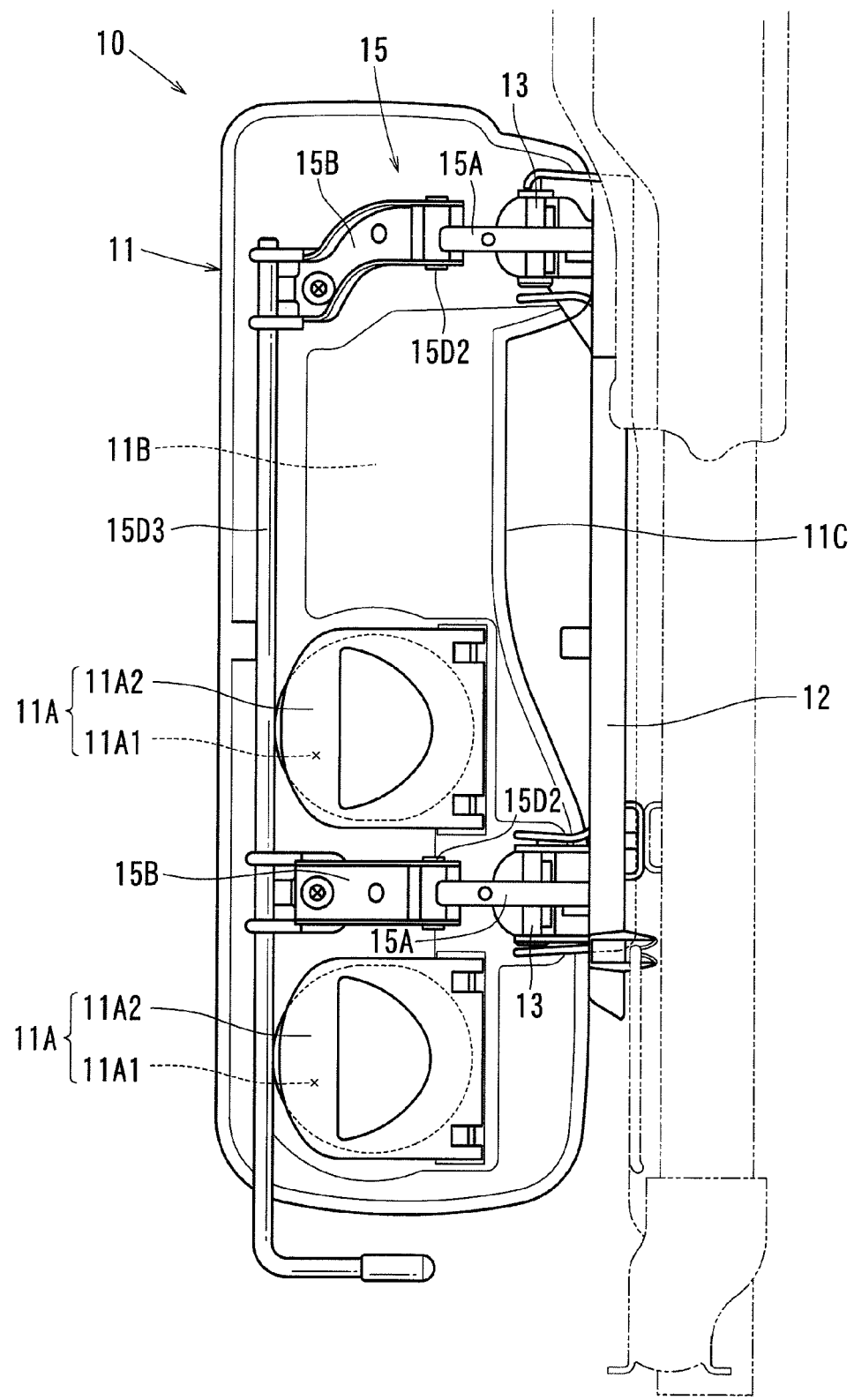
FIG. 9 is a bottom view of the table.
Figure 10:
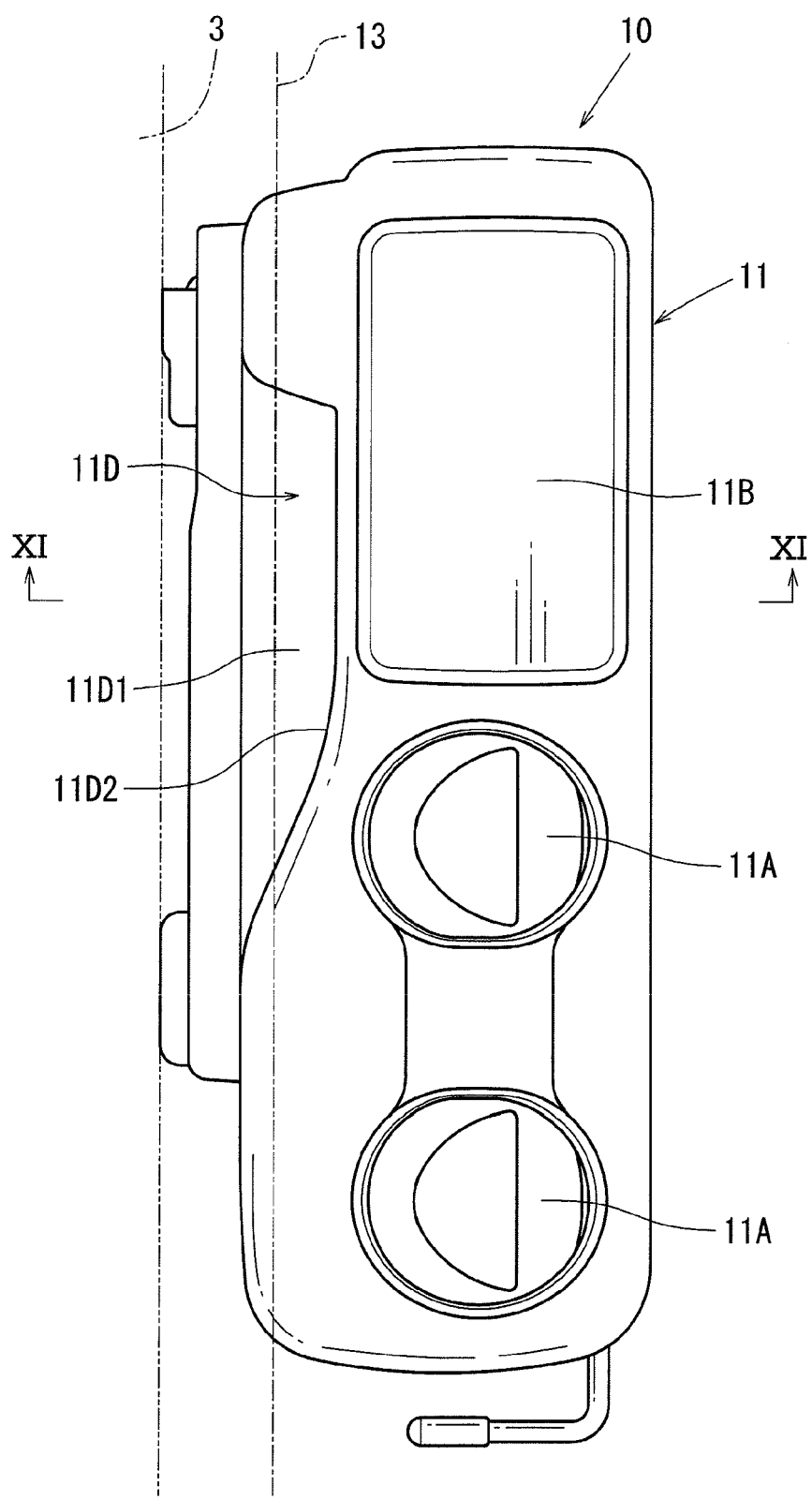
FIG. 10 is a plane view of a table having another configuration in an expanded state.
Figure 11:
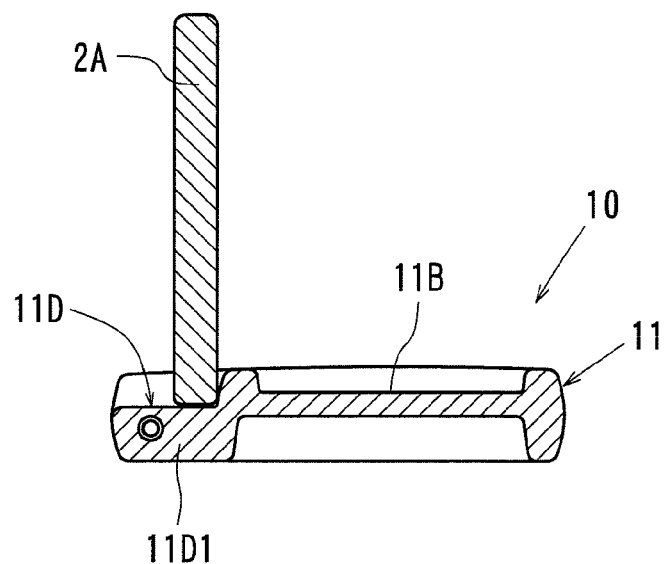
FIG. 11 is a cross-sectional view of the table taken along line XI-XI in FIG. 10 and an armrest when the seat back is brought down to the folded position.
Figure 12:
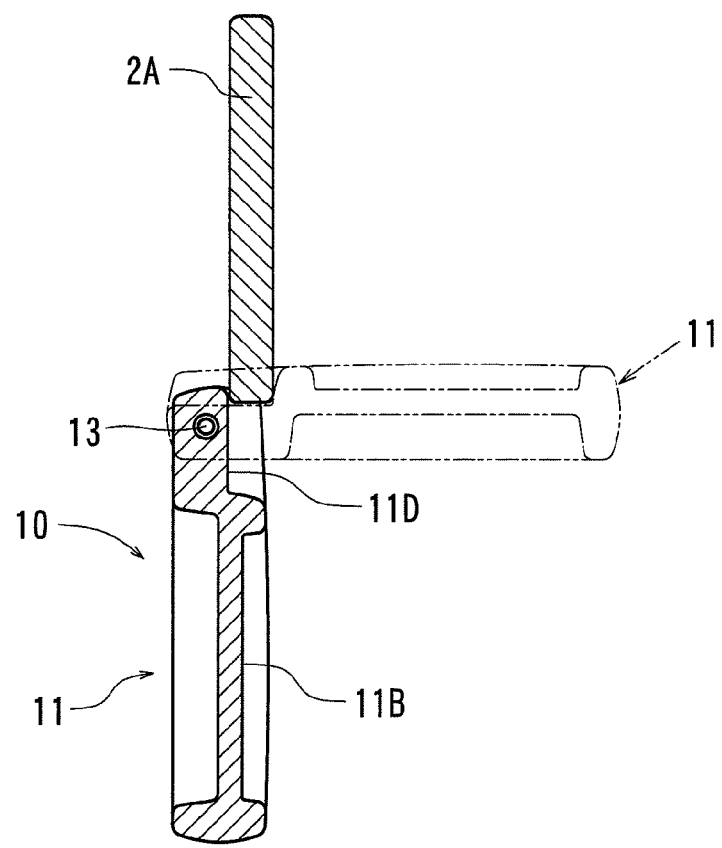
FIG. 12 is a cross-sectional view of the table and the armrest of FIG. 11 when the seat back is brought down to the folded position while the table is in a storage state.

The table 10 may have a recess 11D shown in FIGS. 10-12 instead of the recess 11C shown in FIGS. 8 and 9. As shown in FIGS. 10 and 11, the recess 11D is formed in a portion of the table 10 near the seat cushion 3. The recess 11D opens upward from the table 10 to be configured to receive the armrest 2A. When the seatback 2 is brought down on the seat cushion 3 while the table 10 is set in an expanded state, the bottom end of the armrest 2A (in a non-use position) is inserted into the recess 11D.

As shown in FIGS. 10 and 11, the recess 11D has a bottom 11D1 and a peripheral wall 11D2. The bottom 11D1 serves as a lower surface of the recess 11D to prevent objects setting on the table 10 from falling through the recess 11D. The peripheral wall extends along the rotation shafts 13. When the table 10 is rotated about the rotation shaft from the expanded state to a storage state, the recess 11d opens upward from the table 10 to be configured receive the armrest 2A. When the seatback 2 is brought down on the seat cushion 3 while the table 10 is set in the storage state, the bottom end of the armrest 2A in the non-use position is inserted into the recess 11D.

As described above, the table 10 may have the recess 11c shown in FIG. 8 or the recess 11d shown in FIG. 10. Alternatively or additionally, the table 10 may have a hole to prevent the table 10 from interfering with the armrest 2A when the seatback 2 is brought down to a predetermined position. The hole may be formed in the table 10 near the seat cushion 3. The hole penetrates through the table 10 in a thick direction of the table 10.

What is claimed is:

1. A vehicular seat comprising:
    a seatback configured to be tiltably connected to a seat cushion;
    a table provided beside the seat cushion;
    an armrest mounted to a side portion of the seatback; and
    a recess defining a side edge portion of the table adjacent the seat cushion, the recess being configured to prevent the table from interfering with the armrest when the seatback is brought down to a predetermined position.

2. The vehicular seat of claim 1, wherein
    the table is configured to move between a use position, where the table horizontally projects from a side portion of the seat cushion, and a folded position, where the table extends along the side portion of the seat cushion, and
    the recess is configured to prevent the table from interfering with the armrest when the table is in either the use position or the folded position.

3. The vehicular seat of claim 2, wherein
    the table has a rotation shaft for allowing rotation between the use position and the folded position, and the rotation shaft extends along an edge of the table at the use position near the seat cushion, and
    the recess is situated on the axis of the rotation shaft.

4. The vehicular seat of claim 3, wherein
    the table includes two rotation shaft sections and the recess is a space between the two rotation shaft sections.

5. The vehicular seat of claim 4, wherein
    when the table is in the folded position, the recessed space is open in the upward direction and the armrest is received by the recess.

* * * * *